US011211220B1

(12) United States Patent
Steffka

(10) Patent No.: US 11,211,220 B1
(45) Date of Patent: Dec. 28, 2021

(54) FUSE ARRAY AND JUNCTION BOX WITH FUSE ARRAY

(71) Applicant: Sumitomo Wiring Systems, Ltd., Mie (JP)

(72) Inventor: Aaron M. Steffka, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/930,937

(22) Filed: Jul. 16, 2020

(51) Int. Cl.
*H01H 85/055* (2006.01)
*H01H 85/20* (2006.01)
*H02G 3/16* (2006.01)
*H01R 13/46* (2006.01)

(52) U.S. Cl.
CPC ........ *H01H 85/203* (2013.01); *H01H 85/055* (2013.01); *H01H 85/205* (2013.01); *H01R 13/46* (2013.01); *H02G 3/16* (2013.01); *H01H 2085/2055* (2013.01); *H01H 2085/2075* (2013.01)

(58) Field of Classification Search
CPC .. H01H 85/055; H01H 85/203; H01H 85/205; H01H 2085/0233; H01H 2085/2055; H01H 2085/2075; H01H 2085/208; H01H 2085/209; H01R 13/46; H02G 3/16
See application file for complete search history.

(56) References Cited

U.S. PATENT DOCUMENTS

| 5,886,611 | A | * | 3/1999 | Schaller | H01H 85/044 337/189 |
|---|---|---|---|---|---|
| 2003/0022536 | A1 | * | 1/2003 | Saito | H05K 7/026 439/76.2 |
| 2004/0137792 | A1 | * | 7/2004 | Matsumura | H01H 85/044 439/630 |
| 2013/0120101 | A1 | * | 5/2013 | Taguchi | H01H 85/22 337/190 |
| 2014/0097932 | A1 | * | 4/2014 | Fussl | H01H 85/2045 337/191 |
| 2015/0130584 | A1 | * | 5/2015 | Totsuka | H01H 61/04 337/186 |
| 2017/0324233 | A1 | * | 11/2017 | Kimura | H01H 85/175 |
| 2020/0185180 | A1 | * | 6/2020 | Urrea | H01H 85/055 |

* cited by examiner

*Primary Examiner* — Jacob R Crum
(74) *Attorney, Agent, or Firm* — Honigman LLP

(57) ABSTRACT

A fuse array includes a main bus bar extending along a first plane and a plurality of first terminals electrically connected to the main bus bar via first fuse elements. Each of the plurality of first terminals are a planar member having a continuous surface so as to form a male blade. The male blade is configured to be seated into a terminal connector housing having a female blade so as to form an electric connection. The first terminals are disposed on a plane orthogonal to the first plane of the main bus bar.

9 Claims, 10 Drawing Sheets

FUSE ARRAY AND JUNCTION BOX WITH FUSE ARRAY

TECHNICAL FIELD

The present specification generally relates to fuse arrays and junction box assemblies with fuse arrays configured to distribute power.

BACKGROUND

A depiction of a conventional fuse array 300 mounted in a power distribution box 400 is provided FIG. 1. Conventional fuse arrays 300 include a terminal bus 302 having a plurality of terminals 302. The terminals 302 are connected to the terminal bus 302 via a plurality of fuse elements (not shown). The fuse elements may be stamped from the same metal in which the terminals are stamped and the fuse elements are thinned out sections of the bus bar.

The terminals 302 are generally planar members each having a hole 302a configured to receive a bolt 304. An eyelet terminal 306 with an opening 306a is mounted on top of the terminals 302 and secured thereto with a nut (not shown).

An example of such a conventional eyelet terminal and bolt engagement is shown in FIG. 9. As the opening 306a of the eyelet terminal 306 is round, the eyelet terminal 306 may rotate. Each eyelet terminal 306 is separated from each other by an inner wall 402 of the power distribution box 400 which prevents the eyelet terminals 306 from contacting each other due to a rotation about the bolt 304. It should be appreciated that contact by adjacent eyelet terminals 306 may result in electrical damage to the electric device that the eyelet terminal 306 is wired to.

Accordingly, it remains desirable to have a fuse array which eliminates the rotation of the terminals and eliminates the need for the inner walls.

SUMMARY

In one aspect of the disclosure, a fuse array is provided. The fuse array includes a main bus bar. The main bus bar extends along a first plane. The main bus bar includes a plurality of first terminals and a plurality of first fuse elements. The first fuse elements electrically connect the main bus bar to the first terminals.

The first terminals are a planar member having a continuous surface so as to receive a terminal connector. In particular, the terminal connector is a box type terminal connector having a female blade configured to receive the respective first terminals. The fuse array may include a first sleeve which covers the fuse elements.

In one aspect the first terminals are disposed on a second plane that is orthogonal to a first plane of the main bus bar. The first terminals may include a support wall and a contact member that is orthogonal to the support wall. The support wall and the contact member may be orthogonal to the first plane of the main bus bar. In one aspect the contact member is disposed along an edge of the support wall so as to be offset from a center of the support wall.

In another aspect the fuse array includes a plurality of second terminals. In such an aspect the main bus bar is a generally planar member having a first side opposite a second side. The first terminals are disposed on the first side of the main bus bar, and the second terminals are disposed on a second side so as to be offset from the first terminals.

The second terminals are configured to receive a bolt so as to secure a conventional eyelet terminal thereto. The fuse array may further include a plurality of second fuse elements electrically connecting the second terminals to the main bus bar. A second sleeve may be disposed on the second fuse elements so as to cover the second fuse elements.

In another aspect of the disclosure a power distribution box is provided. The power distribution box includes a housing configured to accommodate the fuse array. The housing includes a base and a plurality of terminal housings. Each of the terminal housings has a slot which extends along a height of the power distribution box.

The fuse array includes a main bus bar extending along a first plane and a plurality of first terminals. A plurality of fuse elements electrically connect the main bus bar to a corresponding first terminal. Each of the first terminals are a planar member having a continuous surface.

Each of the first terminals are seated within a corresponding slot of the terminal housings. In one aspect the terminal housings include a pair of side walls spaced apart from each other so as to define the slot. In one aspect, the housing may include a front wall and a front edge of the base is spaced apart from the front wall so as to define an axial slot.

The fuse array may further include a plurality of second terminals. In such an aspect the main bus bar is a generally planar member having a first side opposite a second side. The plurality of first terminals are disposed on the first side of the main bus bar and the plurality of second terminals are disposed on the second side of the main bus bar. The power distribution box includes an axial slot configured to receive the second terminals. The second terminals may include a slot that is open to a distal end so as to receive a bolt.

The power distribution box may further include a pair of ribs that are spaced apart from each other. The ribs are disposed on a bottom surface of the base and an inner surface of the front wall. The power distribution box may further includes a cover configured to cover the first terminals.

Accordingly the fuse array and the power distribution box disclosed herein provides a connection to a terminal connector which prevents the rotation of the terminal connector and therefore limits the instance of the terminal connectors rotating and contacting each other so as to insure the proper functioning of the power distribution box.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Referring generally to the figures, embodiments of the present disclosure include a fuse array having a main bus bar extending along a first plane and a plurality of first terminals electrically connected to the main bus bar via first fuse elements. Each of the plurality of first terminals are a planar member having a continuous surface so as to form a male blade. The male blade is configured to be seated into a terminal connector housing having a female blade so as to form an electric connection.

Embodiments herein include a power distribution box having a fuse array, and the fuse array include a main bus bar extending along a first plane and a plurality of first terminals that are electrically connected to the main bus bar via first fuse elements. The power distribution box is configured to receive female connector housings which are seated onto the respective first terminals so as to form an electric connection.

Figure 3:
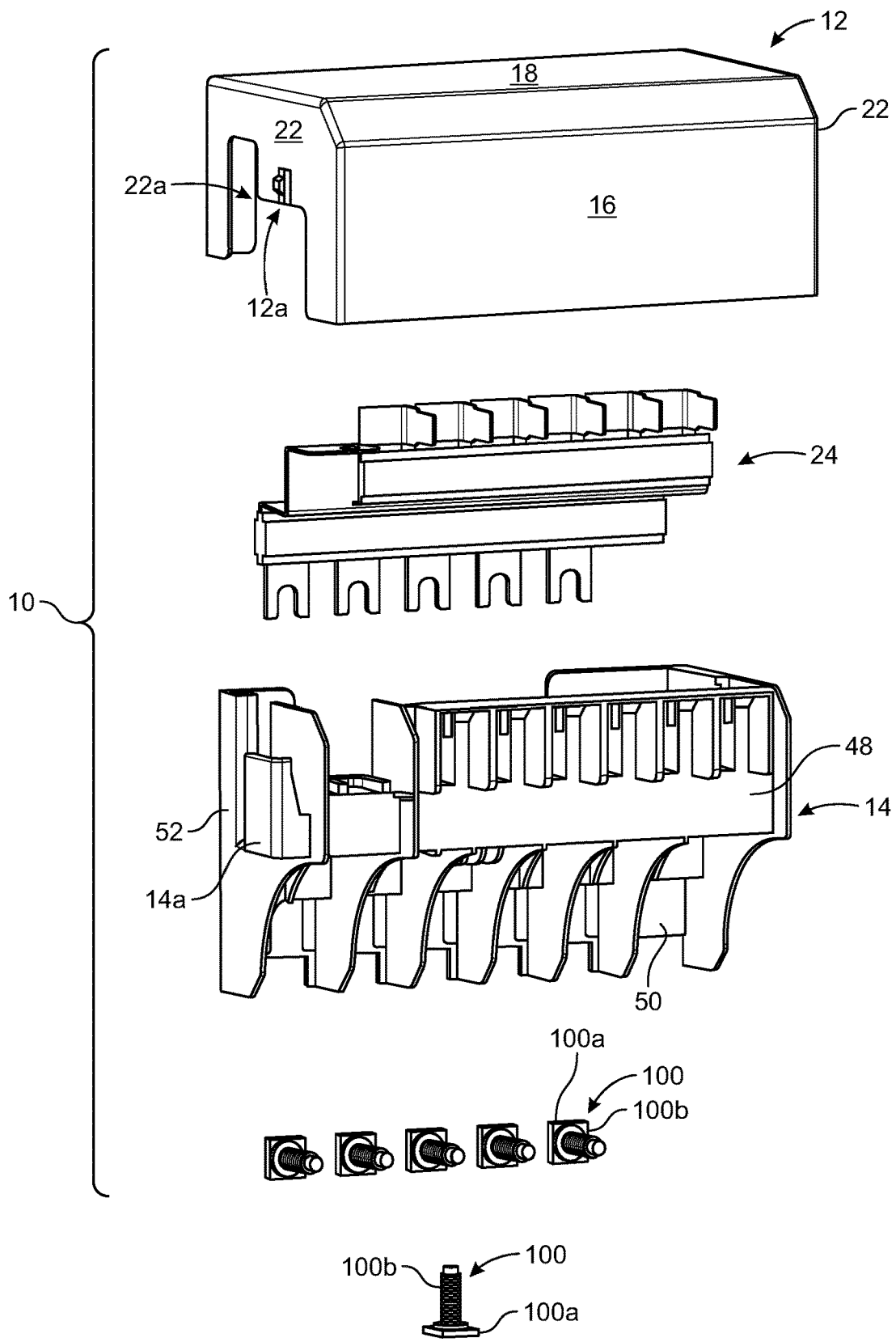
FIG. 3 is an exploded view of the power distribution box shown in FIG. 2.

As used herein, the term top, bottom, front and back refer to an orientation of a part as referenced in FIG. 3. For example, a part that is referenced as being in front, or a "front" is a part which appears forward of a part which is referenced as being in back or a "back". Likewise, a part which may be referenced as a top refers to an element that is above a part which is referenced as a bottom.

Figure 1:
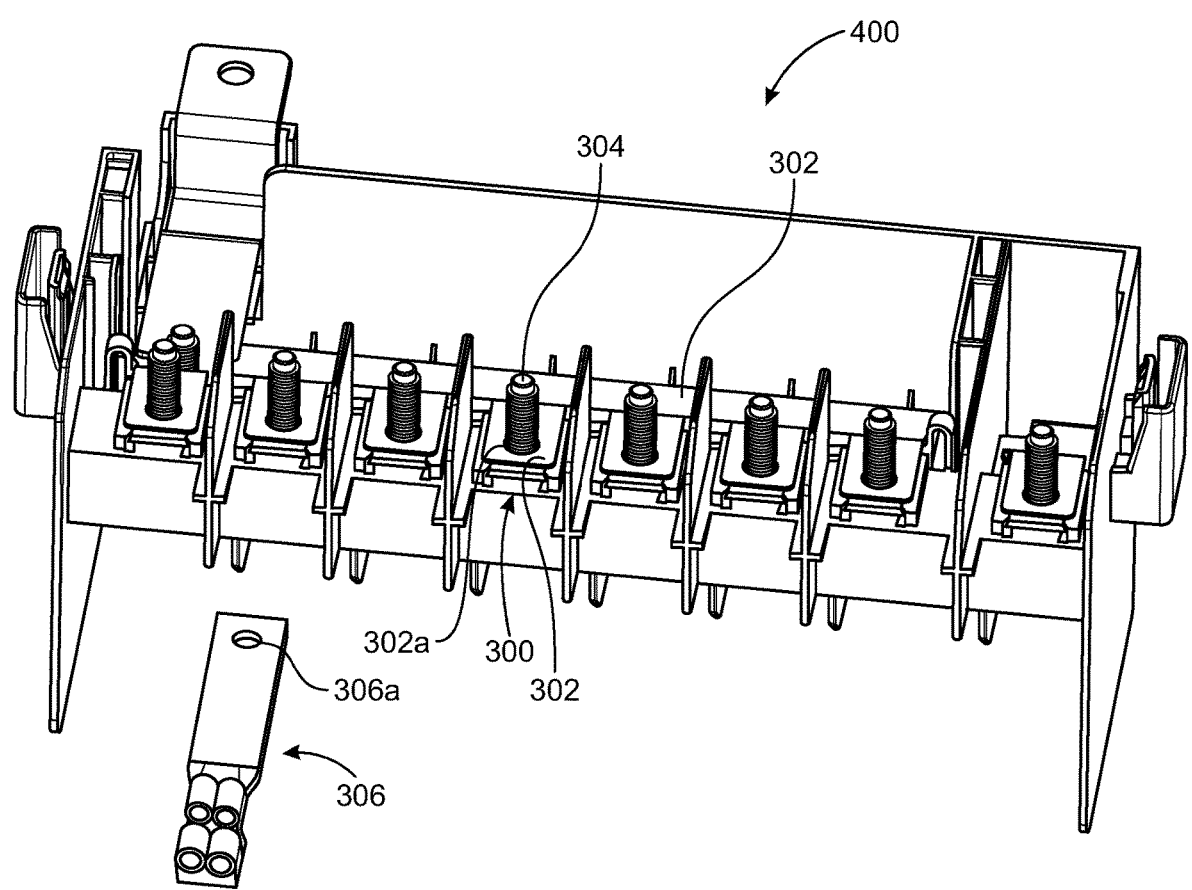
FIG. 1 is a perspective view of a fuse array and a power distribution box of the prior art.
Figure 2:
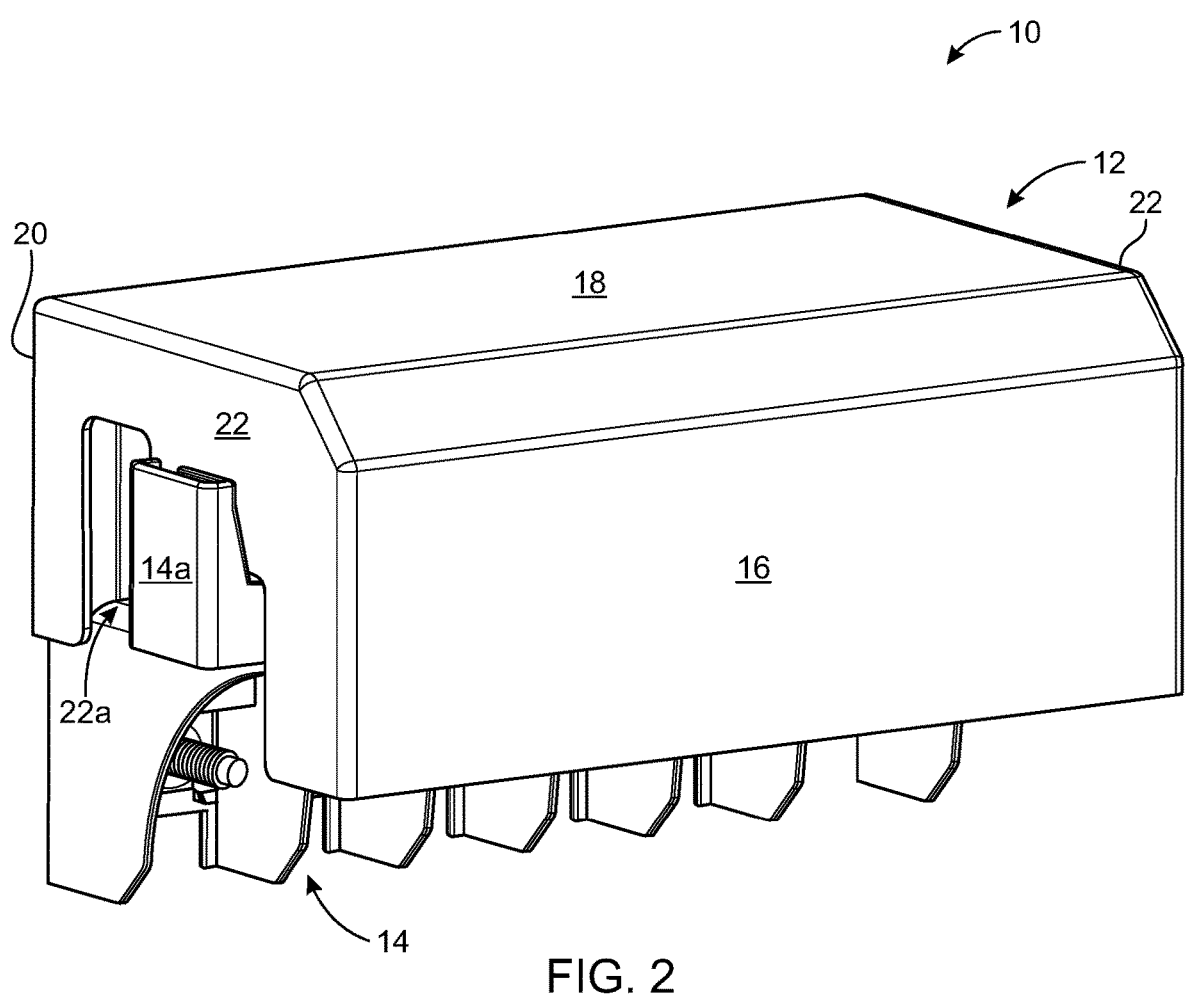
FIG. 2 is an assembled view of a power distribution box according to one or more aspects described herein.

With reference now to FIGS. 1 and 2, a power distribution box 10 is provided. The power distribution box 10 includes a cover 12 and a housing 14. The cover 12 is configured to cover the housing 14. The cover 12 may include a front wall 16, a top wall 18, a back wall 20 and a pair of side walls 22. The side walls 22 may include an opening 22a configured to allow for wire (not shown) to pass. The cover 12 is mounted onto the housing 14 using conventional fastening techniques. For illustrative purposes the cover 12 is shown as having a tab 12a which is configured to engage a catch 14a disposed on the housing 14. The housing 14 is dimensioned to receive a fuse array 24.

Figure 4:
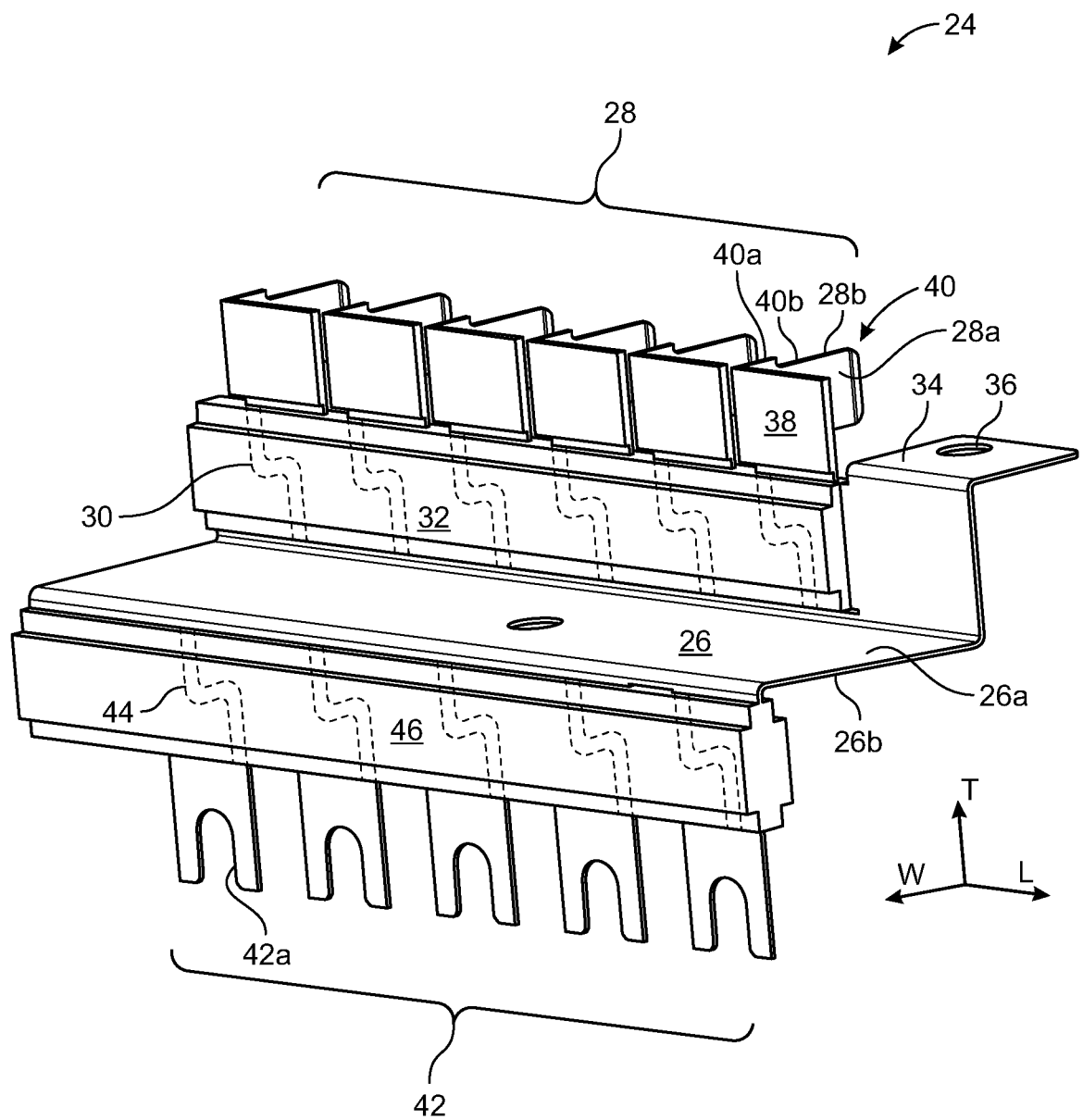
FIG. 4 is an isolated view of an illustrative embodiment of a fuse array taken from the back.
Figure 5:
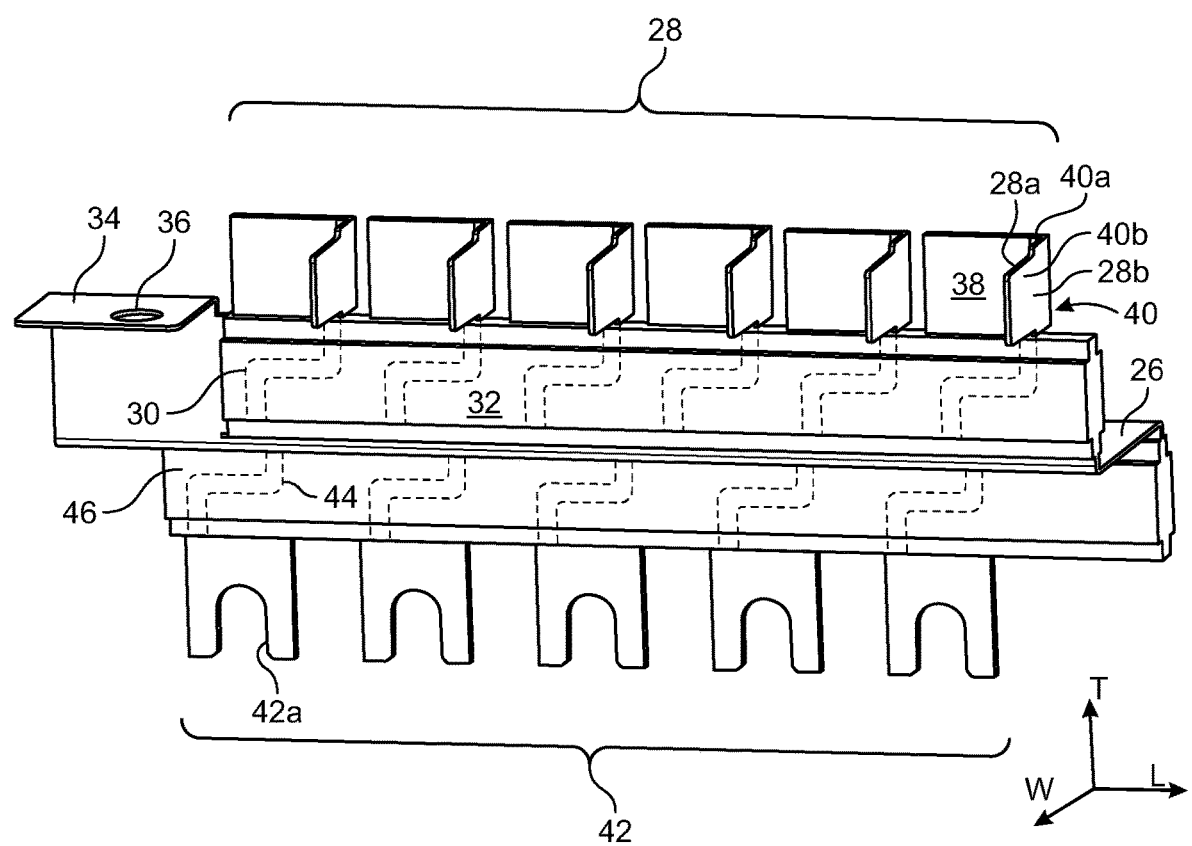
FIG. 5 is a view of the fuse array shown in FIG. 4 taken from the front.

With reference now to FIGS. 4 and 5, a description of an embodiment of a fuse array 24 is provided. The fuse array 24 includes a main bus bar 26. The main bus bar 26 may be stamped from an electrically conductive material, any electrically conductive material currently known or later developed may be modified for use herein, illustratively including steel. The main bus bar 26 is a generally planar member having a width "W", a length "L" and a thickness "T", as indicated by the directional arrows indicating the same. The main bus bar 26 extends along a first plane, which is defined by axis "W" and "L".

The main bus bar 26 further includes a plurality of first terminals 28. The first terminals 28 extend outwardly from the main bus bar 26 and are shown as being equally spaced apart from each other. However, it should be appreciated that the first terminals 28 may be spaced apart from each other at irregular distances. The first terminals 28 are planar members having a continuous surface. In particular, the first terminals 28 have a first surface 28a opposite of a second surface 28b, the first surface 28a and the second surface 28b are bound by a peripheral edge. The first and second surfaces 28a, 28b are planar and continuous between opposing sides of the peripheral edge. The first terminals 28 define male blades which are configured to be inserted into a terminal connector 200 (shown in FIG. 10) having a female blade.

Each of the first terminals 28 is electrically connected to the main bus bar 26. In particular, a plurality of first fuse elements 30 electrically connect the main bus bar 26 to a corresponding one of the plurality of first terminals 28. The first fuse elements 30 are shown in dashed lines. The fuse elements 30 are configured to limit power to a respective first terminal 28. Each of the first terminals 30 may be connected to electric devices (not shown) having different power specifications. Accordingly, the first fuse elements 30 may be shaped differently from each other. For illustrative purposes, the first fuse elements 30 are shown as having the same shape and size. In particular, first fuse elements 30 are generally shown as having a "Z" shape. It should be appreciated that the shape and the size of the first fuse elements 30 are provided for illustrative purposes only and are not intended to limit the scope of the appended claims.

The first fuse elements 30 may be covered by a first sleeve 32. The first sleeve 32 is configured to electrically insulate the main bus bar 26 from the first fuse elements 32. The first sleeve 32 may be formed of an electrically insulating material that may include fire retardant features, any such material currently known and later developed may be modified for use herein.

Figure 10:
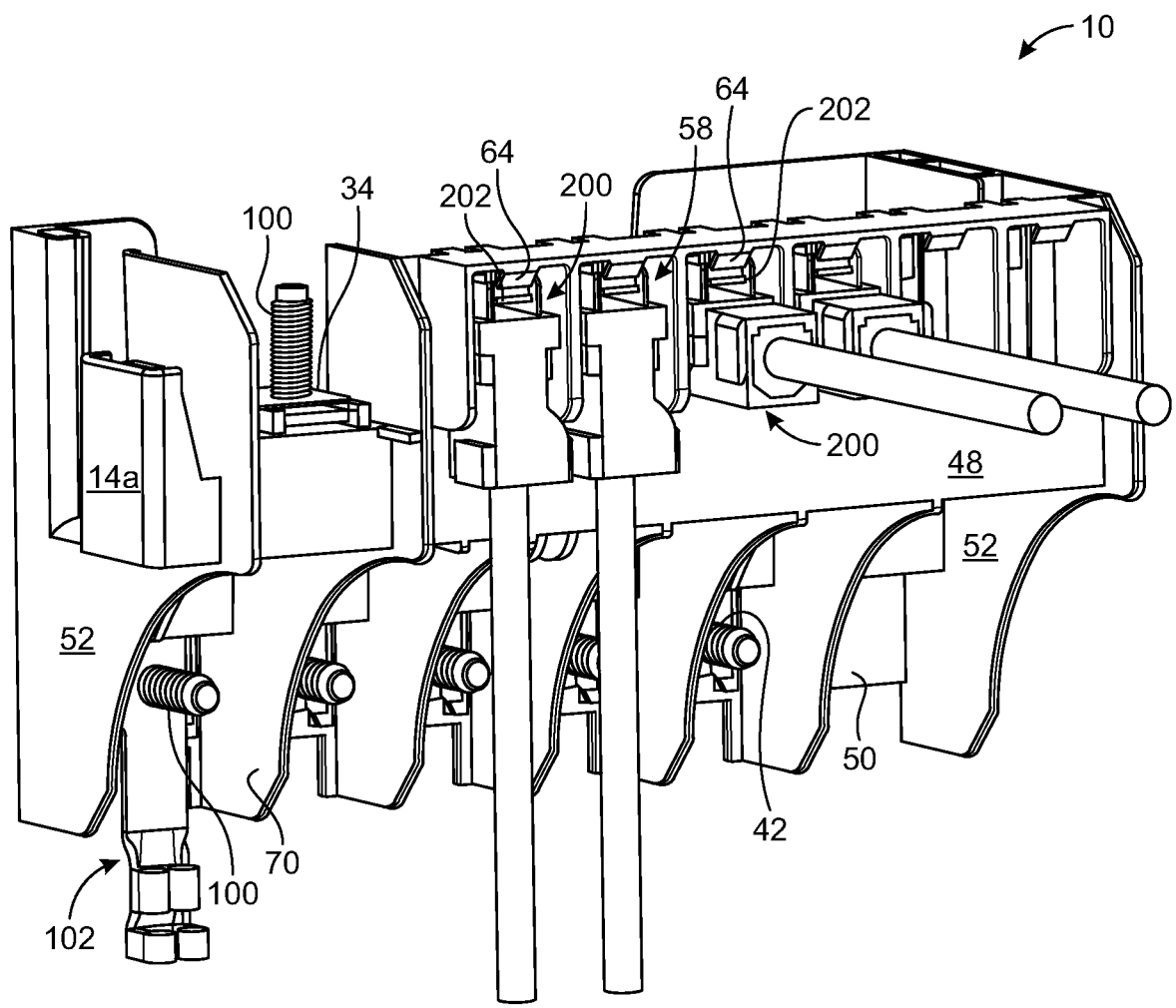
FIG. 10 is a perspective view showing the connectors mounted to the first terminals.

For illustrative purposes, the fuse array 24 is shown as having six first terminals 28 and an auxiliary terminal 34 is disposed on a side of the main bus bar 26. The auxiliary terminal 34 is a terminal of conventional construct in that the auxiliary terminal 34 is configured to receive a bolt 100, an example of such a bolt 100 is shown in FIG. 10. The auxiliary terminal 34 may include a through-hole 36 for which a bolt 100 is to be inserted. An eyelet terminal 102 (such as the eyelet terminal shown in FIG. 10) is mounted onto the bolt 100 and a nut (not shown) is threaded onto the bolt 100 pinching the eyelet terminal 102 onto the auxiliary terminal 34 so as to complete an electric connection in a conventional manner.

The auxiliary terminal 34 is shown directly connected to the main bus bar 26. That is, there is no fuse element separating the auxiliary terminal 34 from the main bus bar 26. Accordingly, the auxiliary terminal 34 may be helpful in directing power to another power distribution box or an electric device that includes a voltage regulating means.

Each of the first terminals 28 illustratively include a support wall 38 and a contact member 40 that is orthogonal to the support wall 38. The contact member 40 and the support wall 38 are both orthogonal to the first plane of the main bus bar 26. As shown in FIGS. 4 and 5, the first plane of the main bus bar 26 is defined by the intersection of axes "W" and "L", and the support wall 38 is disposed on a plane defined by the intersection of axes "T" and "L", and the contact member 40 is disposed on a plane defined by the intersection of axes "T" and "W."

For illustrative purposes, the support wall 38 is shown as being a planar member having a generally rectangular dimension. A base 40a of the contact members 40 may have a height, as defined by axis "T", equal to that of a height of the support wall 38 and a front portion 40b of the first terminals 28 may have a height which is shorter than the height of the base 40a so as to define a notch 40c. The distal end of the first terminals 28 may be ribbed so as to help ensure a proper electric connection with a female terminal connector 200. As the contact members 40 are planar and are seated into a corresponding slot of a female terminal connector 200, the female terminal connector 200 cannot rotate about the planar contact member 40, thus eliminating the chance that adjacent terminal connectors 200 can rotate into each other.

In one aspect the fuse array 24 may further include a plurality of second terminals 42. The second terminals 42 are disposed on a second side of the main bus bar 26 and the first terminals 28 are disposed on a first side of the main bus bar 26 so as to have the first terminals 28 and second terminals 42 spaced apart from each other. The first terminals 28 may extend upwardly from a top surface 26a of the main bus bar 26 and the second terminals 42 extend downwardly from a bottom surface 26b of the main bus bar 26, so as to be offset from each other.

The second terminals 42 may be connected to the main bus bar 26 via second fuse elements 44. The second terminals 42 are configured to receive a bolt 100. In one aspect the second terminals 42 have a U-shaped slot 42a which is open to a distal end of the second terminals 42 and the bolt 100 is simply seated into the U-shaped slot 42a. An eyelet terminal 102, illustratively shown in FIG. 10, is mounted onto the bolt 100 so as to cover the second terminals 42. A nut (not shown) is threaded onto the bolt 100 pinching the eyelet terminal 102 and the second terminals 42 together so as to form an electric connection.

The second fuse elements 44 may be covered with a second sleeve 46. The second fuse elements 44 are shown in dashed lines. The second fuse elements 44 are configured to limit power to a respective second terminal 42. Each of the second terminals 42 may be connected to electric devices (not shown) having different power specifications. Accordingly, the second fuse elements 44 may be shaped differently from each other. For illustrative purposes, the first second elements 44 are shown as having the same shape and size. In particular, second fuse elements 44 are generally shown as having a "Z" shape. It should be appreciated that the shape and the size of the second fuse elements 44 are provided for illustrative purposes only and are not intended to limit the scope of the appended claims.

The second sleeve 46, as with the first sleeve 32, may be formed of an electrically insulating material that may include fire retardant features, any such material currently known and later developed may be modified for use herein. Preferably, the first and second sleeves 32, 46 entirely cover the respective first and second fuse elements 30, 42. The first and second sleeves 32, 46 are further configured to provide structural rigidity to the respective first and second fuse elements 30, 42.

The fuse array 24 may be stamped out of an electrically conductive material as a singular unit. Accordingly, the first terminals 28, the fuse elements, the main bus bar 26 and the second terminals 42 may be formed out of the same piece of electrically conductive material. The first and second sleeves may be formed onto the respective the respective first and second fuse elements 30, 42 after the stamping process.

Figure 6:
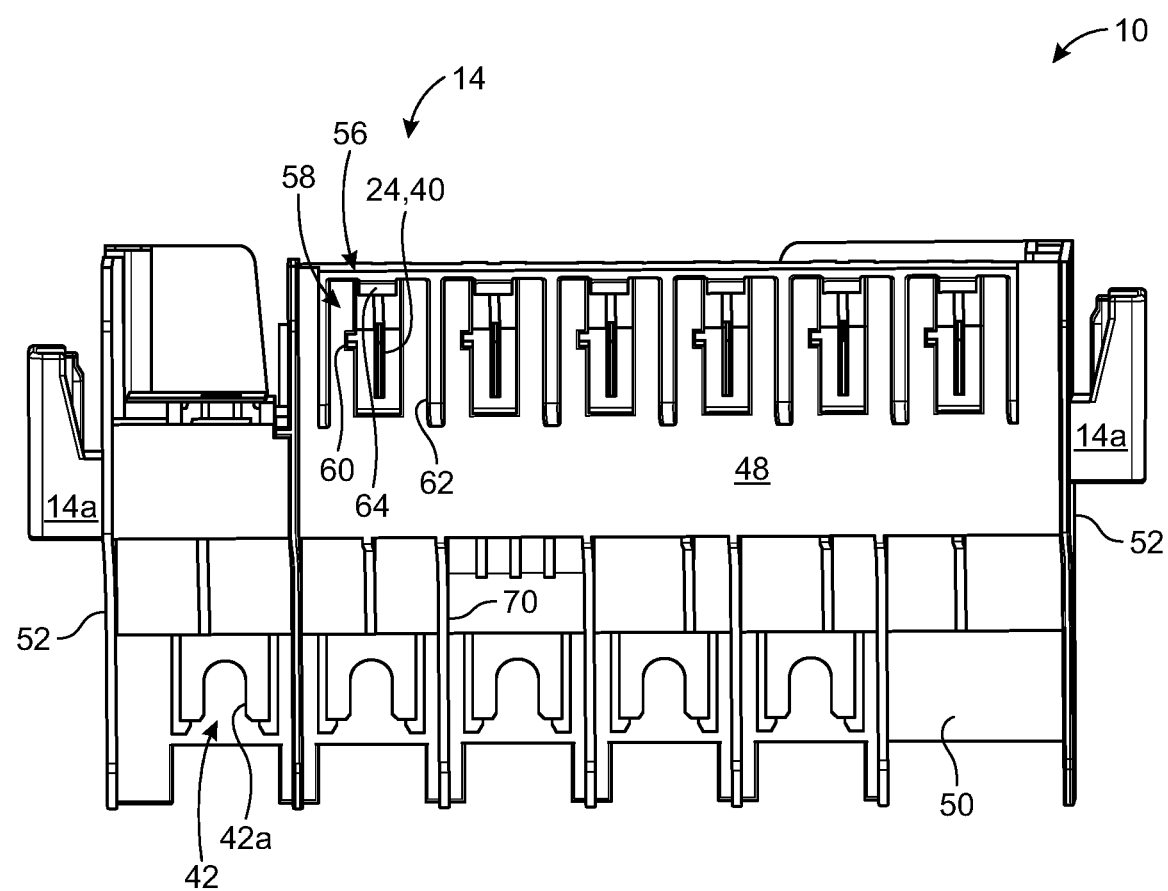
FIG. 6 is a view of the power distribution box taken from the front.
Figure 7:
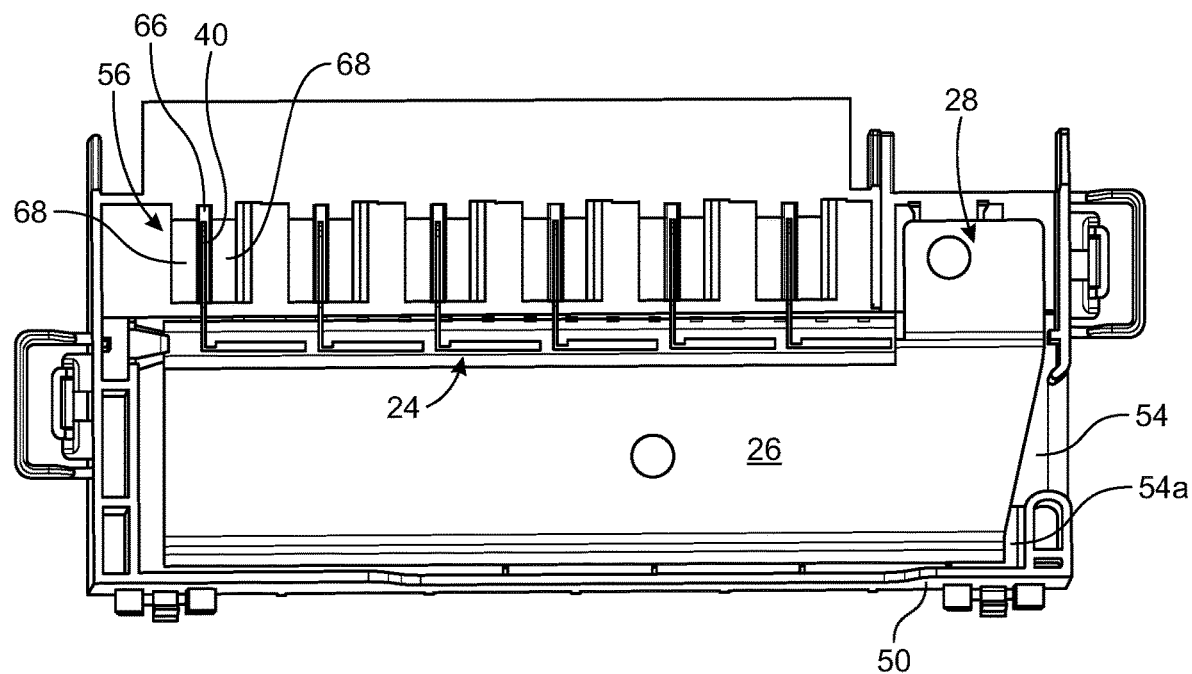
FIG. 7 is a top down view of the power distribution box shown in FIG. 6.

With reference again to FIGS. 2 and 3 now to FIGS. 6 and 7, a description of a power distribution box 10 according to one or more aspects is provided. The power distribution box 10 includes a housing 14. The housing 14 may be formed of a material suitable for an injection molding processes, illustratively including polypropylene. The housing 14 is configured to house a fuse array 24 as shown in FIGS. 3, 4 and 5. However, it should be appreciated that the housing 14 and the fuse array 24 shown herein may be modified without limiting the scope of the appended claims. For instance, the fuse array 24 may include a different number of first terminals 28 or second terminals 42 and the width of the main bus bar 26 may differ in proportion than what is shown.

The housing 14 includes a first wall 48, a second wall 50 and a pair of end walls 52. The first wall 48 is disposed on a front of the housing 14 and the second wall 50 is disposed on a back of the housing 14. The end walls 52 define the sides of the housing 14. The housing 14 further includes a support portion 54. The support portion 54 is a generally planar member configured to support the main bus bar 26 of the fuse array 24.

FIG. 6 is a depiction of the housing 14 taken from the front. The housing 14 includes a plurality of terminal housings 56. The first terminal housings 56 include a terminal cavity 58. The first terminals 28 are seated within a terminal cavity 58 of a respective terminal housing 56. The terminal housings 56 are arranged in an array.

Each terminal cavity 58 includes an indent 60 configured to register a terminal connector 200 (shown in FIG. 10) into the terminal cavity 58 so as to ensure that the first terminals 28 are properly seated with the respective terminal connector 200. For illustrative purposes, the indents 60 are shown as being located in the same position relative to each of the terminal cavities 58. However, the indents 60 may be located in different positions of the terminal cavity 58. In such a manner, the terminal connectors 200 having a mating feature that is registered to be seated within a respective indent 60 of a respective terminal cavity 58. As such, the housing 14 may be configured to ensure that the proper terminal connector 200 is seated within a predetermined terminal cavity 58.

The terminal cavities 58 are separated from each other by an inner wall 62. Each terminal cavity 58 includes a catch 64. The catch 64 is configured to retain the terminal connector 200 within a respective terminal cavity 58. In one aspect, the catch 64 is disposed on a top of the terminal cavity 58. It should be appreciated that the catch 64 may be disposed on a side or bottom of the terminal cavity 58 as well.

With reference now to FIG. 7, a top down view of the housing 14 is shown. FIG. 7 illustrates the ease at which the housing 14 is assembled. In particular, the terminal housings 56 are disposed on a front portion of the housing 14 and is disposed along a front side of the support portion 54. The support portion 54 is a generally planar member configured to receive the main bus bar 26. The first terminals 28 are spaced apart from each other so as to be received in a corresponding slot 66 of the terminal housings 56.

The housing 14 may further include an axial slot 54a. The axial slot 54a extends along an axis between the support portion 54 and the second wall 50 of the housing 14. The axial slot 54a has a width configured to receive the second terminals 42.

Figure 8:
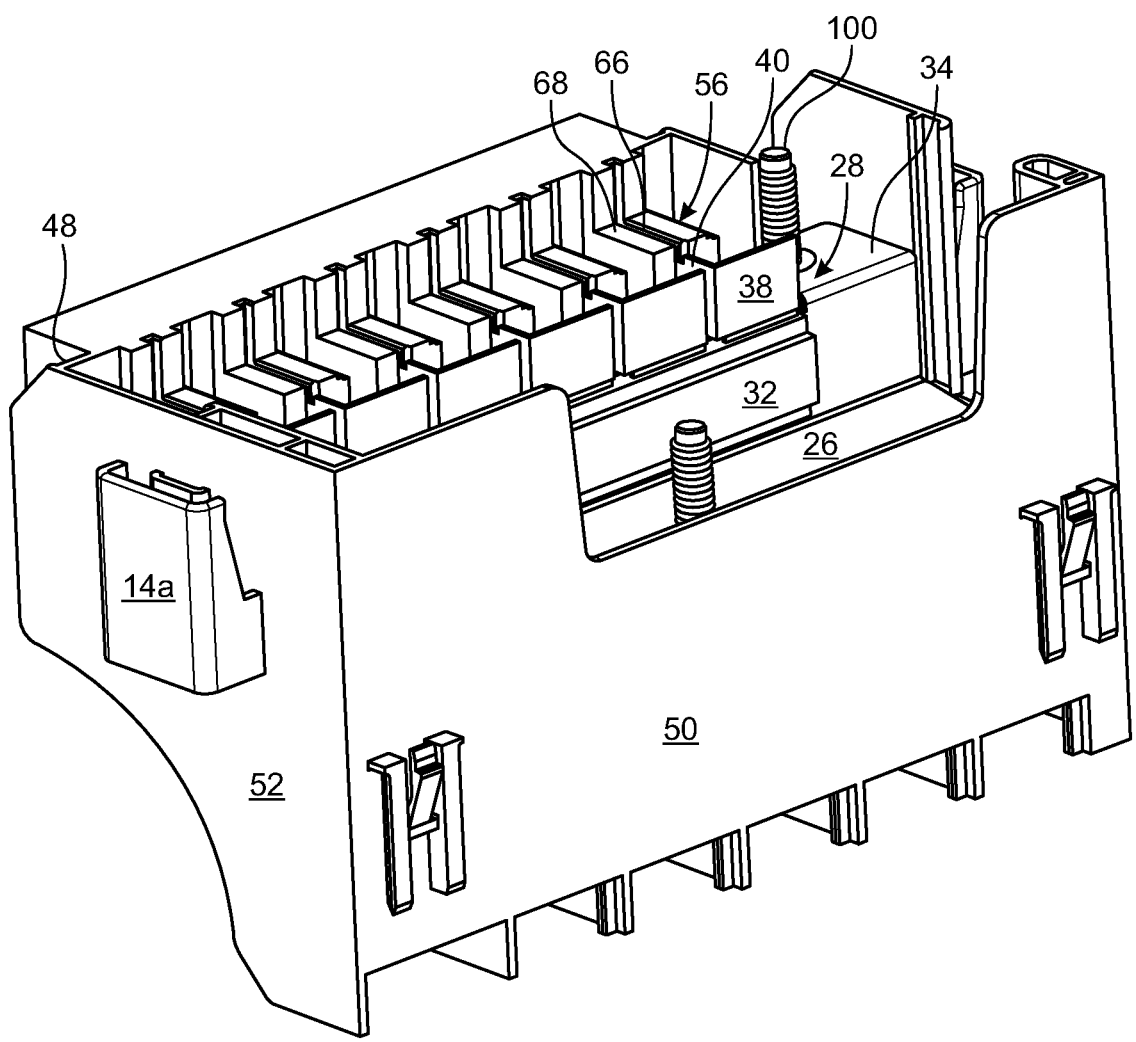
FIG. 8 is top down view taken from the back of the power distribution box shown in FIG. 6.

With reference again to FIG. 7 and now to FIG. 8, the slots 66 are defined by a pair of terminal side walls 68. The inner surface of the terminal side walls 68 of a respective terminal housing 56 are spaced apart from each other so as to define the terminal cavity 58 (shown in FIG. 6) for which the terminal connector 200 is seated as shown in FIG. 10 and is described in more detail below. The contact members 40 of the first terminals 28 are thinner than the slots 66 so as to pass through the slots 66 with a predetermined amount of tolerance.

Figure 9:
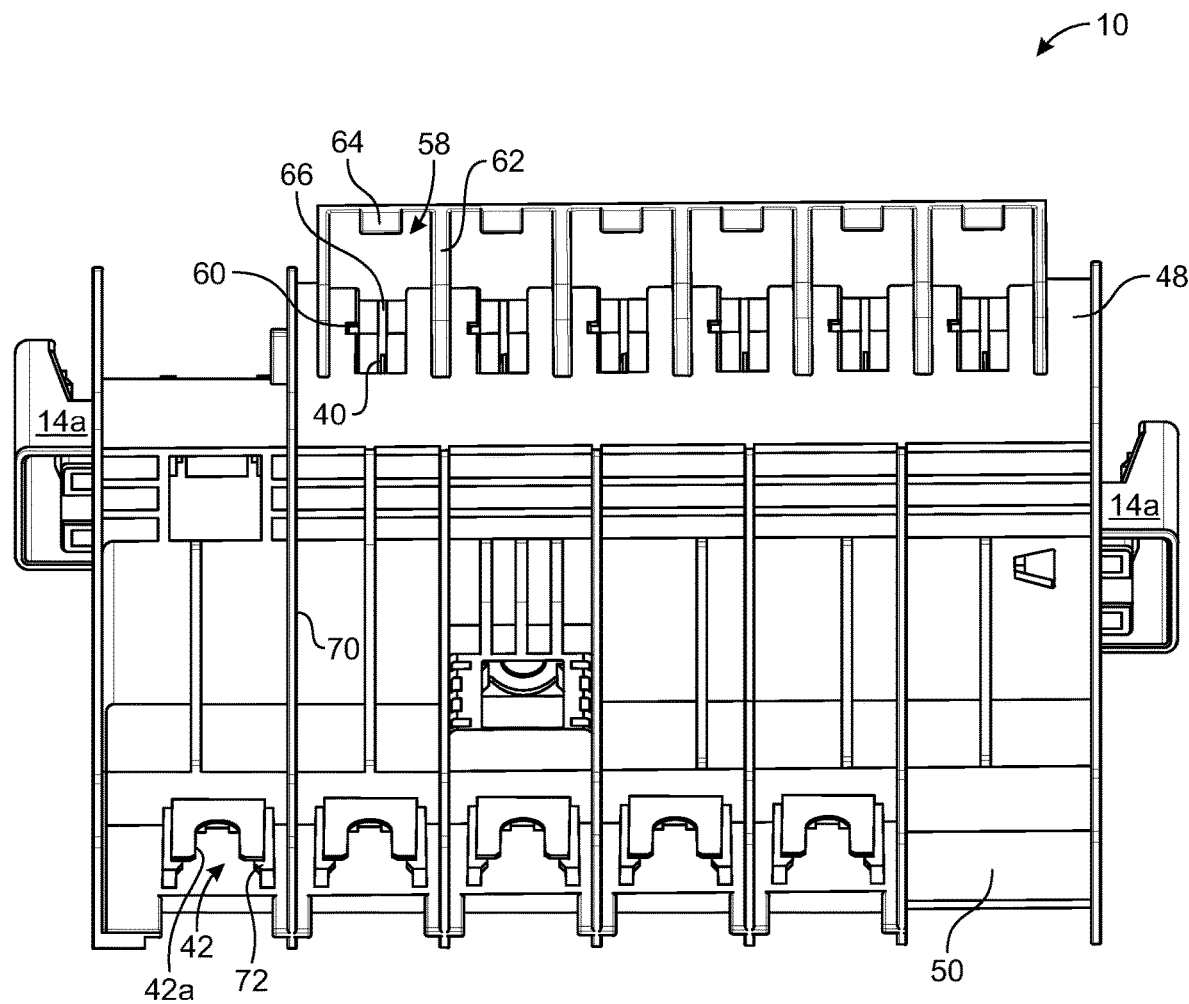
FIG. 9 is a bottom view taken from the front of the power distribution box shown in FIG. 6.

With reference now to FIG. 9, a bottom view taken from the front of the housing 14 is shown. The second terminals 42 are passed through the axial slot 54a and are seated against the second wall 50 of the housing 14. The housing 14 may further include a plurality of ribs 70 having an arcuate surface. The ribs 70 are spaced apart from each other and disposed between the second terminals 42 so as to prevent adjacent eyelet terminals 102 which are attached thereto from coming into contact with each other due to rotation.

In particular, the U-shaped slots 42a of the second terminals 42 are seated against a base portion 72 which is configured to receive the head 100a of a bolt 100 (shown in FIG. 3). The shaft of the bolt 100 extends orthogonal there through and an eyelet terminal 102 (shown in FIG. 10) is mounted onto the bolt 100 and pressed onto the second terminal 42 and pinched into engagement with the second terminal 42 using a nut which is not shown. Accordingly, the eyelet first terminals 28 may rotate and the ribs 70 prevent the eyelet first terminals 28 from contacting each other so as to maintain the functionality of the housing 14.

With reference now to FIG. 10, an illustrative depiction of a terminal connector 200 adaptable for use herein is provided. It should be appreciated that any terminal connector 200 currently known or later developed may be modified for use herein. The terminal connector 200 is a generally block shaped member and includes a resilient tab 202 that is mounted to a top surface of the terminal connector 200.

The terminal connector 200 includes a slit (not shown) and houses a female connector (not shown). The slit is inserted onto a respective first terminal 28 so as to form an electric connection. The terminal connector 200 is pushed into the terminal cavity 58 until the catch 64 engages a respective tab 202 securing the terminal connector 200 thereto. In addition, the removal of a terminal connector 200 is simply done by pressing downwardly on a respective tab 202 and sliding the terminal connector 200 out of the terminal cavity 58.

Thus, unlike the conventional use of an eyelet terminal 102 a nut need not be disengaged from a bolt 100 to disconnect an eyelet terminal 102. Instead, the worker may simply press down on the resilient tab 202. In yet another advantage of the power distribution box 10 and fuse array 24 is shown in FIG. 10 wherein the user may route the wire in different directions based upon the configuration of the terminal connector. For illustrative purposes, two of the terminal connectors 200 are shown having a routing path which extends along the height of the housing 14 and two other terminal connectors 200 show a routing path which extends along a width of the housing 14.

Accordingly, the fuse array 24 and the power distribution box 10 may be optimized so as to accommodate routing requirements of the packaging space. Further, the fuse array 24 and power distribution box 10 disclosed herein eliminate the potential of an electric arc caused by two eyelet terminals 102 rotating and contacting each other.

While particular embodiments have been illustrated and described herein, it should be appreciated and understood that various other changes and modifications may be made without departing from the spirit and scope of the claims subject matter. Moreover, although various aspects of the claims subject matter have been described herein, such aspects need not be utilized in combination. It is therefore intended that the appended claims cover all such changes and modifications that are within the scope of the claims subject matter.

The invention claimed is:

1. A fuse array comprising:
a main bus bar extending along a first plane, wherein the main bus bar is a generally planar member having a first side opposite a second side;
a plurality of first terminals, and a plurality of first fuse elements electrically connecting the main bus bar to a corresponding one of the plurality of first terminals, the plurality of first fuse elements disposed on a second plane orthogonal to the first plane, the plurality of first terminals includes a support wall and a contact member orthogonal to the support wall and coplanar with the plurality of first fuse elements;
a first sleeve covering the plurality of first fuse elements; and
a plurality of second terminals and a plurality of second fuse elements electrically connecting the plurality of second terminals to the main bus bar, the plurality of second fuse elements orthogonal to the main bus bar, the plurality of first terminals disposed on the first side, the plurality of second terminals disposed on the second side, the plurality of second terminals including a U-shaped slot that is open to a distal end, and wherein the plurality of first terminals are disposed on a first side edge of the main bus bar and the plurality of second terminals are disposed on a second side edge of the main bus bar, the second side edge opposite of the first side edge.

2. The fuse array as set forth in claim 1, wherein the contact member is disposed along an edge of the support wall.

3. The fuse array as set forth in claim 2, further including a second sleeve, the second sleeve covering the plurality of second fuse elements.

4. A power distribution box comprising:
a housing having a support portion and a plurality of terminal housings each having a slot;
the fuse array as set forth in claim 1; and
wherein each of the plurality of first terminals are seated within a corresponding slot of the plurality of terminal housings.

5. The power distribution box as set forth in claim 4, wherein each of the plurality of terminal housings includes a pair of side walls spaced apart from each other so as to define the slot.

6. The power distribution box as set forth in claim 4, wherein the housing includes a first wall disposed on a front of the housing and a front edge of the support portion is spaced apart from the front wall so as to define an axial slot.

7. The power distribution box as set forth in claim 6, wherein the plurality of second terminals are disposed within the axial slot.

8. The power distribution box as set forth in claim 7, further including a pair of ribs spaced apart from each other the pair of ribs disposed on a bottom surface of the support portion and an inner surface of the first wall.

9. The power distribution box as set forth in claim 4, further including a cover configured to cover the housing.

* * * * *